(12) United States Patent
Sugiyama et al.

(10) Patent No.: US 11,137,332 B2
(45) Date of Patent: Oct. 5, 2021

(54) PARTICULATE DETECTION APPARATUS

(71) Applicant: NGK SPARK PLUG CO., LTD., Nagoya (JP)

(72) Inventors: Takeshi Sugiyama, Nagoya (JP); Yoshinori Hibino, Nagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 316 days.

(21) Appl. No.: 16/505,262

(22) Filed: Jul. 8, 2019

(65) Prior Publication Data

US 2020/0011780 A1    Jan. 9, 2020

(30) Foreign Application Priority Data

Jul. 9, 2018 (JP) .............................. JP2018-129985

(51) Int. Cl.
*G01N 15/06* (2006.01)
*B01D 46/44* (2006.01)
(Continued)

(52) U.S. Cl.
CPC ..... *G01N 15/0656* (2013.01); *B01D 46/0063* (2013.01); *B01D 46/442* (2013.01); *F01N 11/00* (2013.01); *B01D 2279/30* (2013.01); *F01N 2550/04* (2013.01); *G01N 2015/0046* (2013.01); *G01N 2015/0662* (2013.01)

(58) Field of Classification Search
CPC ....... G01N 15/0656; G01N 2015/0046; G01N 2015/0662; B01D 46/442; B01D 46/0063; B01D 2279/30; F01N 11/00; F01N 2550/04; F01N 2900/0422;
(Continued)

(56) References Cited

U.S. PATENT DOCUMENTS 8,249,827 B2 *   8/2012   Nelson ............... F02D 41/1466
                                                   702/183
8,561,388 B2 *  10/2013   Yahata ............... G01N 15/0656
                                                    60/277
(Continued)

FOREIGN PATENT DOCUMENTS

JP      2012-122399 A    6/2012

*Primary Examiner* — Freddie Kirkland, III
(74) *Attorney, Agent, or Firm* — Sughrue Mion, PLLC

(57) ABSTRACT

A particulate detection apparatus for controlling a particulate sensor which detects the amount of particulates discharged from a filter for collecting particulates contained in exhaust gas. The particulate sensor includes a detection section configured to electrify particulates contained in exhaust gas so as to produce electrified particulates. The particulate detection apparatus includes a period judgment section, an output obtainment section and an anomaly judgment section. The period judgment section judges whether or not the present point in time is within a previously set anomaly determination period just after completing a filter regeneration process. The output obtainment section obtains a sensor output representing the result of detection by the particulate sensor in the case where the present point in time is judged to be within the anomaly determination period. The anomaly judgment section judges whether or not the particulate sensor is anomalous based on the sensitivity characteristic of the sensor output.

5 Claims, 10 Drawing Sheets

(51) Int. Cl.
    *B01D 46/00*     (2006.01)
    *F01N 11/00*     (2006.01)
    *G01N 15/00*     (2006.01)

(58) Field of Classification Search
    CPC ..... F01N 2900/0416; F01N 2900/1606; F01N 9/002; F01N 2560/05; F01N 3/023; Y02T 10/40
    See application file for complete search history.

(56) References Cited

U.S. PATENT DOCUMENTS

| | | | |
|---|---|---|---|
| 8,823,400 B2 * | 9/2014 | Hocken | F02D 41/222 324/691 |
| 9,151,204 B2 * | 10/2015 | Hashida | F02D 41/222 |
| 9,316,574 B2 * | 4/2016 | Sakamoto | G01N 15/0656 |
| 9,638,127 B2 * | 5/2017 | Hocken | G01R 35/005 |
| 10,458,306 B2 * | 10/2019 | Takaoka | F01N 3/021 |
| 2011/0109331 A1 * | 5/2011 | Nelson | G01N 15/0656 324/693 |
| 2012/0031078 A1 * | 2/2012 | Sakamoto | F02D 41/2474 60/277 |
| 2012/0144813 A1 | 6/2012 | Yahata et al. | |
| 2015/0211429 A1 * | 7/2015 | Hocken | G01R 35/005 324/601 |
| 2018/0135493 A1 * | 5/2018 | Takaoka | F01N 3/021 |
| 2020/0116066 A1 * | 4/2020 | Takizawa | F01N 11/00 |
| 2020/0240303 A1 * | 7/2020 | Hartmann | F01N 3/023 |

\* cited by examiner

PARTICULATE DETECTION APPARATUS

BACKGROUND OF THE INVENTION

1. Field of the Invention

The present disclosure relates to a particulate detection apparatus for detecting the amount of particulates contained in exhaust gas.

2. Description of the Related Art

Patent Document 1 discloses a failure diagnosis apparatus which judges whether or not a failure has occurred to a filter attached to an exhaust pipe based on a detection signal from a particulate sensor disposed on the downstream side of the filter. The particulate sensor disclosed in Patent Document 1 has a pair of electrodes. When a constant voltage is applied across the pair of electrodes, a current corresponding to the amount of particulates that has deposited on the electrode structure to form a conductive soot path flows between the pair of electrodes. The particulate sensor outputs a detection signal corresponding to the current flowing between the pair of electrodes.

[Patent Document 1] Japanese Patent Application Laid-Open (kokai) No. 2012-122399

3. Problems to be Solved by the Invention

However, in the case where no failure has occurred in the filter, the amount of particulates discharged from the filter is very small. Therefore, in the case where the value of the detection signal output from the particulate sensor is small, it is impossible to determine the reason why the detection signal has a small value; i.e., the detection signal may have a small value because the filter is normal, or the detection signal may have a small value because the particulate sensor is anomalous. This may lower the reliability of filter failure diagnosis.

SUMMARY OF THE INVENTION

It is therefore an object of the present disclosure to improve the reliability of filter failure diagnosis.

The above object has been achieved by providing (1) a particulate detection apparatus for controlling a particulate sensor which detects an amount of particulates discharged from a filter attached to an exhaust pipe of an internal combustion engine for collecting particulates contained in exhaust gas discharged from the internal combustion engine. The particulate sensor includes a detection section configured to electrify particulates contained in the exhaust gas flowing into an interior of the detection section so as to produce electrified particulates.

The particulate detection apparatus includes a period judgment section, an output obtainment section, and an anomaly judgment section. The period judgment section is configured to judge whether or not a present point in time is within a previously set anomaly determination period just after completing a filter regeneration process for regenerating the filter by removing the particulates collected by the filter. The output obtainment section is configured to obtain a sensor output representing the result of detection by the particulate sensor in the case where the period judgment section judges that the present point in time is within the anomaly determination period. The anomaly judgment section is configured to judge whether or not the particulate sensor is anomalous, based on a sensitivity characteristic of the sensor output obtained by the output obtainment section.

The particulate detection apparatus (1) configured as described above can detect the amount of particulates which are discharged from the filter just after completing the filter regeneration process. As used herein, the terms "just after" and "just before" mean that an assessment is made within a time interval in which there is no substantial change in the assessed value. The collection efficiency of the filter just after completing the filter regeneration process is lower than the collection efficiency before starting the filter regeneration process. Namely, just after completing the filter regeneration process, the sensor output becomes larger as compared with the sensor output before starting the filter regeneration process. Therefore, in the case where the sensor output is smaller than a previously set normal lower limit just after completing the filter regeneration process, it is possible to judge that the particulate sensor is anomalous because the particulate sensor does not have a predetermined sensitivity for the particulate amount.

As described above, the particulate detection apparatus (1) can judge whether or not the particulate sensor is anomalous, based on a sensitivity characteristic of the sensor output. Therefore, in the case where the sensor output is small, the particulate detection apparatus of the present disclosure can determine the reason for the small sensor output; i.e., the sensor output is small because the filter is normal or the sensor output is small because the particulate sensor is anomalous. As a result, the particulate detection apparatus of the present disclosure can enhance the reliability of filter failure diagnosis.

In a preferred embodiment (2) of the particulate detection apparatus (1) above, the detection section includes a discharge section configured to cause generated ions to adhere to particulates contained in the exhaust gas, thereby electrifying the particulates. The particulate sensor also includes a heating section, and the particulate detection apparatus includes a heating execution section and an anomaly conclusive determination section. The discharge section is configured to generate ions by means of corona discharge. The heating section is configured to heat the discharge section. The heating execution section is configured to execute the heating by the heating section in the case where the anomaly judgment section judges that the particulate sensor is anomalous. The anomaly conclusive determination section is configured to conclusively determine that the particulate sensor is anomalous in the case where the number of times the anomaly judgment section has judged that the particulate sensor is anomalous is greater than a previously set number of times for anomaly conclusive determination.

The particulate detection apparatus (2) configured as described above heats the discharge section by the heating section when it judges that the particulate sensor is anomalous. Thus, the particulates adhering to the discharge section can be burned and removed. Therefore, in the case where the particulate sensor is judged to be anomalous because particulates have adhered to the discharge section to lower the detection performance of the detection section, the particulate detection apparatus of the present disclosure can return the particulate sensor to its normal state.

The particulate detection apparatus (2) conclusively determines that the particulate sensor is anomalous in the case where the number of times the particulate detection apparatus has judged that the particulate sensor is anomalous is greater than the number of times for anomaly conclusive determination. Namely, the particulate detection apparatus of the present disclosure does not conclusively determine that the particulate sensor is anomalous in the case where the particulate sensor has returned to the normal state as a result of heating of the discharge section by the heating section. Therefore, the particulate detection apparatus of the present disclosure can prevent needless reporting of an anomaly when the particulate sensor is returned to the normal state.

In another preferred embodiment (3) of the particulate detection apparatus (1) or (2) above, the anomaly judgment section includes an upstream particulate amount obtainment section, a first relevant value computation section, and a second relevant value computation section. The anomaly judgment section judges whether or not the particulate sensor is anomalous, based on a sensitivity characteristic obtained using a first downstream particulate relevant value computed by the first relevant value computation section and a second downstream particulate relevant value computed by the second relevant value computation section. The upstream particulate amount obtainment section is configured to obtain upstream particulate amount information representing an upstream particulate amount which is the amount of particulates contained in the exhaust gas before flowing into the filter. The first relevant value computation section is configured to compute the first downstream particulate relevant value, which relates to the amount of the particulates discharged from the filter within the anomaly determination period, based on the upstream particulate amount represented by the upstream particulate amount information obtained by the upstream particulate amount obtainment section and a previously set collection efficiency just after regeneration which represents the collection efficiency of the filter just after completion of the filter regeneration process. The second relevant value computation section is configured to compute the second downstream particulate relevant value, which relates to the amount of the particulates discharged from the filter within the anomaly determination period, based on the sensor output obtained by the output obtainment section.

The particulate detection apparatus (3) above can quantitatively determine the sensitivity characteristic of the sensor output using the first downstream particulate relevant value estimated based on the upstream particulate amount and the collection efficiency just after regeneration and the second downstream particulate relevant value computed based on the sensor output.

In yet another preferred embodiment (4) of the particulate detection apparatus (3) above, each of the first downstream particulate relevant value and the second downstream particulate relevant value is the average of the amount of the particulates discharged from the filter within the anomaly determination period or in yet another preferred embodiment (5), a cumulative value obtained by cumulating (integrating) the amount of the particulates discharged from the filter within the anomaly determination period. Also, the sensitivity characteristic obtained using the first downstream particulate relevant value and the second downstream particulate relevant value is obtained by, for example, comparing the first downstream particulate relevant value and the second downstream particulate relevant value.

DESCRIPTION OF REFERENCE NUMERALS

Figure 1:
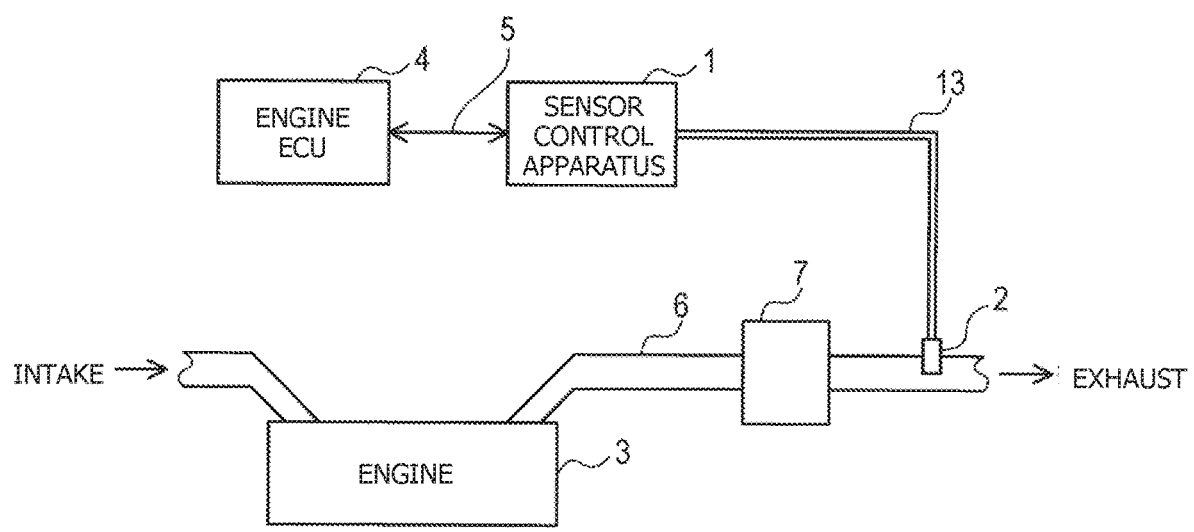
FIG. 1 is a diagram schematically showing the configuration of a system which includes a sensor control apparatus as a constituent element.

Reference numerals used to identify various features in the drawings include the following.

1 . . . sensor control apparatus; 2 . . . particulate sensor; 3 . . . diesel engine; 6 . . . exhaust pipe; 7 . . . DPF; 12 . . . ceramic element; 21 . . . inner metallic member

DETAILED DESCRIPTION OF THE PREFERRED EMBODIMENTS

An embodiment of the present disclosure will now be described with reference to the drawings. However, the present disclosure should not be construed as being limited thereto.

A sensor control apparatus 1 of the present embodiment is mounted on a vehicle and controls a particulate sensor 2 as shown in FIG. 1.

The sensor control apparatus 1 is configured such that data can be transmitted to and received from an electronic control apparatus 4, which controls a diesel engine 3, through a communication line 5. Hereinafter, the electronic control apparatus 4 will be referred to as an engine ECU 4. ECU is an abbreviation of Electronic Control Unit.

A DPF 7 is disposed in an exhaust pipe 6 of the diesel engine 3. The DPF 7 takes in exhaust gas and removes particulate matter contained in the exhaust gas. DPF is an abbreviation for "Diesel Particulate Filter".

The particulate sensor 2 is disposed in the exhaust pipe 6 located on the downstream side of the DPF 7 and detects the amount of particulates (e.g., soot) contained in the exhaust gas discharged from the DPF 7.

Figure 2:
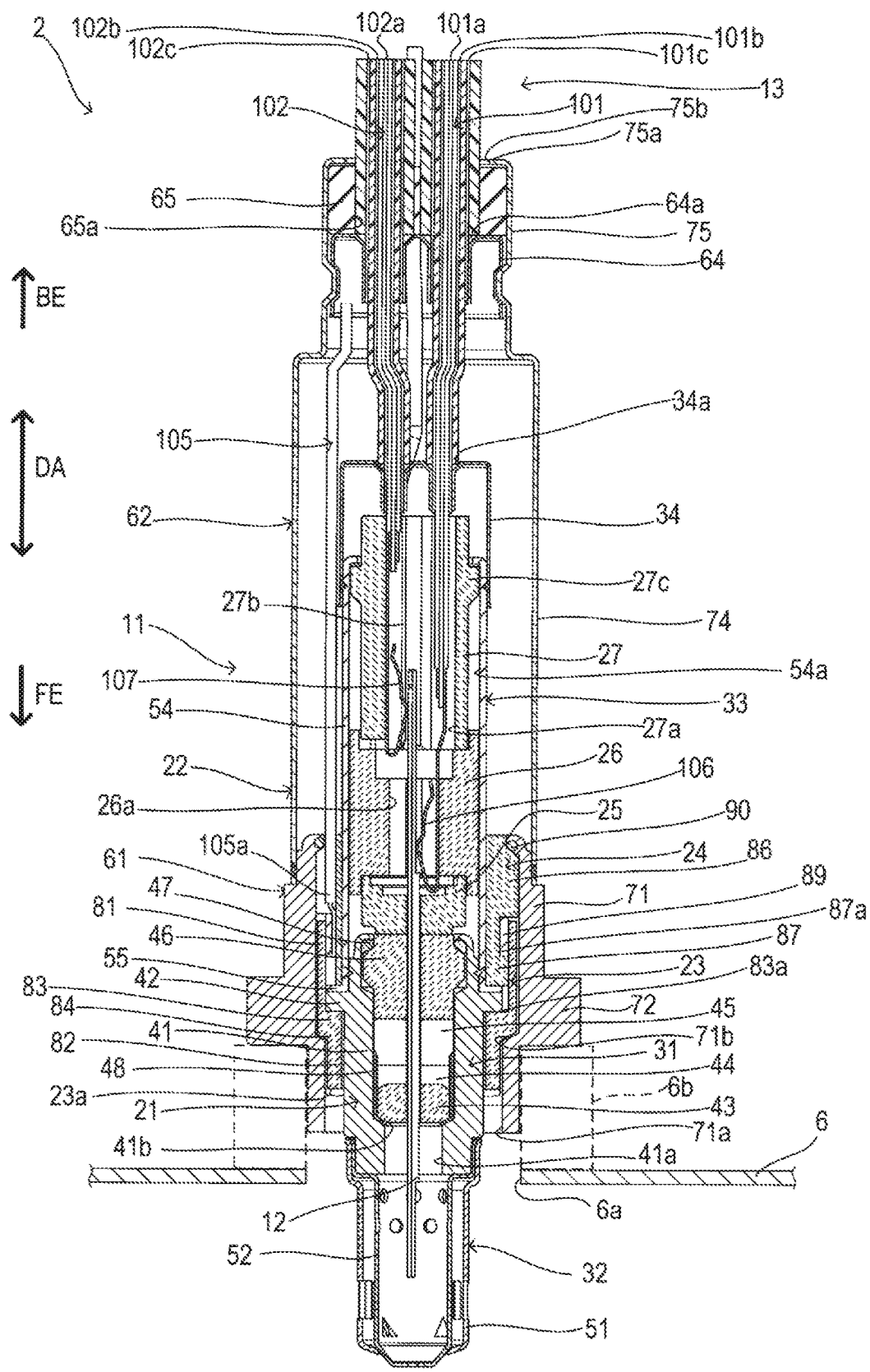
FIG. 2 is a sectional view of a particulate sensor.

As shown in FIG. 2, the particulate sensor 2 includes a casing 11, a ceramic element 12, and cables 13. In FIG. 2, the lower end side of the particulate sensor 2 is defined as the forward end side FE, the upper end side of the particulate sensor 2 is defined as the back end side BE, and the longitudinal direction of the particulate sensor 2 is defined as the axial direction DA.

The casing 11 holds the ceramic element 12 so that a portion of the ceramic element 12 on the forward end side FE protrudes into the exhaust pipe 6.

The casing 11 includes an inner metallic member 21, an outer metallic member 22, insulating spacers 23 and 24, an insulating holder 25, and separators 26 and 27.

The inner metallic member 21 includes a metallic shell 31, a gas introduction pipe 32, an inner tube 33, and an inner tube connection metallic member 34.

The metallic shell 31 is a tubular member formed of stainless steel and extends in the axial direction DA. The metallic shell 31 has a main body 41 and a flange portion 42.

The main body 41 has a cylindrical shape and extends in the axial direction DA. The main body 41 has a through hole 41a which extends therethrough in the axial direction DA and a ledge portion 41b which protrudes toward a radially inner region of the through hole 41a. The ledge portion 41b has an inward taper surface inclined such that the diameter of the taper surface decreases toward the forward end side FE. The flange portion 42 has the shape of a plate extending radially outward from the peripheral surface of the main body 41.

A tubular ceramic holder 43 surrounding the circumference of the ceramic element 12, talc rings (layers formed by charging talc powder) 44 and 45, and a ceramic sleeve 46 are stacked in the through hole 41a of the metallic shell 31 in this order from the forward end side FE toward the back end side BE.

A crimp ring 47 is disposed between the ceramic sleeve 46 and an end portion of the metallic shell 31 on the back end side BE. A metal holder 48 is disposed between the ceramic holder 43 and the ledge portion 41b of the metallic shell 31. The metal holder 48 holds the talc ring 44 and the ceramic holder 43. The end portion of the metallic shell 31 on the back end side BE is a portion which is crimped so as to press the ceramic sleeve 46 toward the forward end side FE via the crimp ring 47.

The gas introduction pipe 32 is provided at an end portion of the metallic shell 31 on the forward end side FE and includes an outer protector 51 and an inner protector 52. Each of the outer protector 51 and the inner protector 52 is a tubular member formed of stainless steel and extends in the axial direction DA. The inner protector 52 is welded to the metallic shell 31 in a state in which the inner protector 52 covers an end portion of the ceramic element 12 on the forward end side FE. The outer protector 51 is welded to the metallic shell 31 in a state in which the outer protector 51 covers the inner protector 52.

The inner tube 33 is a cylindrical member formed of stainless steel and extends in the axial direction DA. The inner tube 33 has a main body 54 and a flange portion 55. The main body 54 has a cylindrical shape, extends in the axial direction DA, and has a through hole 54a extending therethrough in the axial direction DA. The flange portion 55 is provided at the end portion of the main body 54 on the forward end side FE and has the shape of a plate extending radially outward from the periphery of the end portion. The inner tube 33 is welded to the metallic shell 31 in a state in which an end portion of the metallic shell 31 on the back end side BE is fitted into an opening of an end portion of the inner tube 33 on the forward end side FE; i.e., in a state in which the flange portion 55 is placed on the flange portion 42 of the metallic shell 31.

An insulating holder 25, a separator 26, and a separator 27 are stacked in the through hole 54a of the inner tube 33 in this order from the forward end side FE toward the back end side BE.

The insulating holder 25 is a tubular insulative member which surrounds the circumference of the ceramic element 12.

The separator 26 is a cylindrical insulative member extending in the axial direction DA. The separator 26 has a through hole 26a extending therethrough in the axial direction DA. The ceramic element 12 is inserted into the through hole 26a such that the ceramic element 12 protrudes from an end portion of the separator 26 on the back end side BE.

The separator 27 is a cylindrical insulative member extending in the axial direction DA. An end portion of the ceramic element 12 on the back end side BE is inserted into the interior of the separator 27. The separator 27 has a through hole 27a and a through hole 27b which extend therethrough in the axial direction DA. The separator 27 has a flange portion 27c which protrudes radially outward from its outer surface.

An end portion of the inner tube 33 on the back end side BE is crimped so as to press the flange portion 27c toward the forward end side FE. As a result, the insulating holder 25, the separator 26, and the separator 27 are fixedly held by the inner tube 33.

The inner tube connection metallic member 34 is a tubular member formed of stainless steel and closed at its end on the back end side BE. The inner tube connection metallic member 34 is welded to the inner tube 33 in a state in which an end portion of the inner tube 33 on the back end side BE is fitted into an opening of an end portion of the inner tube connection metallic member 34 on the forward end side FE. The inner tube connection metallic member 34 has a plurality of insertion openings 34a which are formed in its end portion on the back end side BE and into which the cables 13 are inserted.

The outer metallic member 22 includes a metallic attachment member 61 and an outer tube 62. The metallic attachment member 61 is a cylindrical member formed of stainless steel and extends in the axial direction DA. The attachment member 61 has a main body 71 and a hexagonal portion 72. The main body 71 has a cylindrical shape, extends in the axial direction DA, and has a through hole 71a extending therethrough in the axial direction DA and a ledge portion 71b protruding toward a radially inner region of the through hole 71a. The ledge portion 71b has an inward taper surface inclined such that the diameter of the taper surface decreases toward the forward end side FE. The main body 71 has an external thread which is formed on the periphery of its portion on the forward end side FE and which is used to attach the particulate sensor 2 to the exhaust pipe 6. The hexagonal portion 72 extends radially outward from the periphery of a portion of the main body 71 on the back end side BE and has the shape of a plate having a hexagonal periphery.

The exhaust pipe 6 has an insertion opening 6a into which the particulate sensor 2 is inserted. An attachment boss 6b is attached to the outer circumferential surface of the exhaust pipe 6 so that the attachment boss 6b surrounds the insertion opening 6a. Therefore, by inserting the particulate sensor 2 into a screw hole of the attachment boss 6b and bringing the external thread of the metallic attachment member 61 into screw engagement with an internal thread formed on the inner circumferential wall of the screw hole of the attachment boss 6b, the particulate sensor 2 is attached to the exhaust pipe 6 such that the gas introduction pipe 32 protrudes from the inner circumferential surface of the exhaust pipe 6.

The outer tube 62 is a cylindrical member formed of stainless steel and extends in the axial direction DA. The outer tube 62 has a large diameter portion 74 and a small diameter portion 75. The large diameter portion 74, which has a cylindrical shape and extends in the axial direction DA, is welded to the metallic attachment member 61 in a state in which an end portion of the metallic attachment member 61 on the back end side BE is fitted into an opening of an end portion of the large diameter portion 74 on the forward end side FE.

The small diameter portion 75, which has a cylindrical shape and extends in the axial direction DA, has an outer diameter and an inner diameter smaller than those of the large diameter portion 74. The small diameter portion 75 protrudes in the axial direction DA from an end portion of the large diameter portion 74 on the back end side BE. The small diameter portion 75 has an annular diameter reducing portion 75a which extends radially inward from its end on the back end side BE. The diameter reducing portion 75a has an insertion opening 75b which is formed in a central region thereof and into which the cables 13 are inserted.

The inner tube 33 and the inner tube connection metallic member 34 are accommodated in the large diameter portion 74. An outer tube connection metallic member 64 and a grommet 65 are accommodated in the small diameter portion 75 in a state in which the outer tube connection metallic member 64 and the grommet 65 are stacked in this order from the forward end side FE toward the back end side BE.

The outer tube connection metallic member 64 is a tubular member formed of stainless steel and closed at its end on the back end side BE. The outer tube connection metallic member 64 has a plurality of insertion openings 64a which are formed in its end portion on the back end side BE and into which the cables 13 are inserted.

The grommet 65 is a circular columnar member formed of heat-resisting rubber and extends in the axial direction DA. The grommet 65 has a plurality of through holes 65a into which the cables 13 are inserted.

The grommet 65 is accommodated in the small diameter portion 75 with its outer circumferential surface being pressed against an inner circumferential surface of the small diameter portion 75. The small diameter portion 75 is crimped radially inward, whereby the outer tube connection metallic member 64 and the small diameter portion 75 are fixed together for integration. As a result, the grommet 65 is fixed inside the small diameter portion 75 in a state in which the grommet 65 closes the insertion opening 75b of the small diameter portion 75.

The insulating spacer 23 is a cylindrical member formed of alumina and extends in the axial direction DA. The insulating spacer 23 has a large diameter portion 81, a small diameter portion 82, a step portion 83, and a sloping portion 84.

The large diameter portion 81 has the shape of a cylinder extending in the axial direction DA. The small diameter portion 82, which also has the shape of a cylinder extending in the axial direction DA, is smaller in outer and inner diameters than the large diameter portion 81 and is disposed on the forward end side FE of the large diameter portion 81.

The step portion 83, which also has the shape of a cylinder extending in the axial direction DA, has an outer diameter equal to that of the large diameter portion 81 and an inner diameter equal to that of the small diameter portion 82. The step portion 83 protrudes in the axial direction DA from an end portion of the large diameter portion 81 on the forward end side FE. As a result, a step 83a protruding radially inward is formed at a location where the large diameter portion 81 is connected to the step portion 83.

The sloping portion 84 is disposed between the step portion 83 and the small diameter portion 82. The sloping portion 84 has the shape of a cylinder whose inner diameter is equal to that of the small diameter portion 82. The sloping portion 84 is tapered such that its outer diameter decreases gradually from a location where the sloping portion 84 is connected to the step portion 83 toward a location where the sloping portion 84 is connected to the small diameter portion 82.

The insulating spacer 23 is accommodated in the through hole 71a of the metallic attachment member 61 in a state in which an outer circumferential surface of the sloping portion 84 is in contact with the ledge portion 71b of the metallic attachment member 61. Since the insulating spacer 23 is accommodated in the metallic attachment member 61 as described above, the insulating spacer 23 has a gas contact surface 23a at its end portion on the forward end side FE. The gas contact surface 23a comes into contact with the exhaust gas.

The metallic shell 31 is accommodated in the insulating spacer 23 in a state in which the flange portion 42 is supported by the step 83a of the insulating spacer 23. As a result, the metallic shell 31 is accommodated in the metallic attachment member 61 in a state in which the metallic shell 31 is electrically insulated from the metallic attachment member 61.

The insulating spacer 24 is a cylindrical member formed of alumina and extends in the axial direction DA. The insulating spacer 24 has a large diameter portion 86 and a small diameter portion 87.

The large diameter portion 86 has the shape of a cylinder extending in the axial direction DA. The small diameter portion 87, which also has the shape of a cylinder extending in the axial direction DA, has an outer diameter smaller than that of the large diameter portion 86 and an inner diameter equal to that of the large diameter portion 86. The small diameter portion 87 protrudes in the axial direction DA from an end portion of the large diameter portion 86 on the forward end side FE. The small diameter portion 87 has a groove 87a which is formed on its outer circumferential surface to extend in the circumferential direction. A cylindrical heater connection metallic member 89 is disposed in the groove 87a.

The insulating spacer 24 is disposed on the back end side BE of the insulating spacer 23 as a result of insertion of the small diameter portion 87 into the internal space of the large diameter portion 81 of the insulating spacer 23. Thus, the inner tube 33 and the metallic attachment member 61 are electrically insulated from each other. A wire packing 90 is disposed between the large diameter portion 86 of the insulating spacer 24 and an end portion of the metallic attachment member 61 on the back end side BE. The end portion of the metallic attachment member 61 on the back end side BE is crimped so as to press the insulating spacer 24 toward the forward end side FE via the wire packing 90. As a result, the insulating spacers 23 and 24 are fixed inside the metallic attachment member 61.

Figure 3:
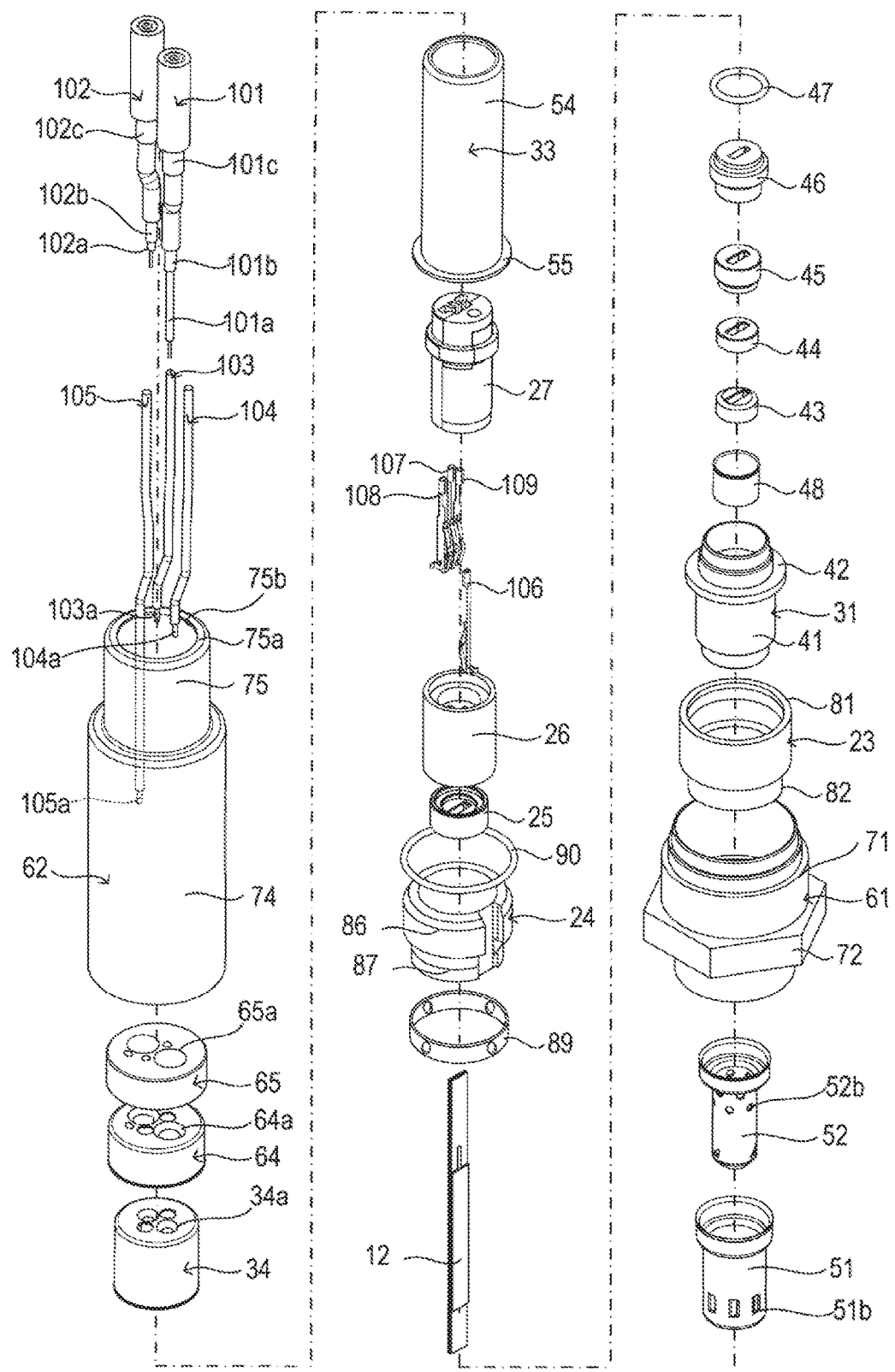
FIG. 3 is an exploded perspective view of the particulate sensor.

As shown in FIG. 3, the cables 13 include electric wires 101, 102, 103, 104, and 105. The electric wire 101 is a triaxial cable and includes a lead wire 101a, an inside outer conductor 101b, and an outside outer conductor 101c. The inside outer conductor 101b surrounds the circumference of the lead wire 101a. The outside outer conductor 101c surrounds the circumference of the inside outer conductor 101b. The electric wire 102 is a triaxial cable and includes a lead wire 102a, an inside outer conductor 102b, and an outside outer conductor 102c. The inside outer conductor 102b surrounds the circumference of the lead wire 102a. The outside outer conductor 102c surrounds the circumference of the inside outer conductor 102b. The electric wires 103, 104, and 105 are single core insulated wires and include lead wires 103a, 104a, and 105a, respectively.

Respective end portions of the lead wires 101a, 102a, 103a, and 104a on the forward end side FE are connected to metallic terminals 106, 107, 108, and 109, respectively. The lead wires 101a, 102a, 103a, and 104a are inserted into the inner tube 33. The metallic terminal 106 is disposed in the separator 26. The metallic terminals 107, 108, and 109 are disposed in the separator 27.

As shown in FIG. 2, the lead wire 105a is inserted into the outer tube 62. An end portion of the lead wire 105a on the forward end side FE is connected to the heater connection metallic member 89. The inside outer conductors 101b and 102b are in contact with the inner tube connection metallic member 34 within the insertion openings 34a of the inner tube connection metallic member 34, so that the inside outer conductors 101b and 102b are electrically connected to the inner metallic member 21. The outside outer conductors 101c and 102c are in contact with the outer tube connection metallic member 64 within the insertion openings 64a of the outer tube connection metallic member 64, so that the outside outer conductors 101c and 102c are electrically connected to the outer metallic member 22.

Figure 4:
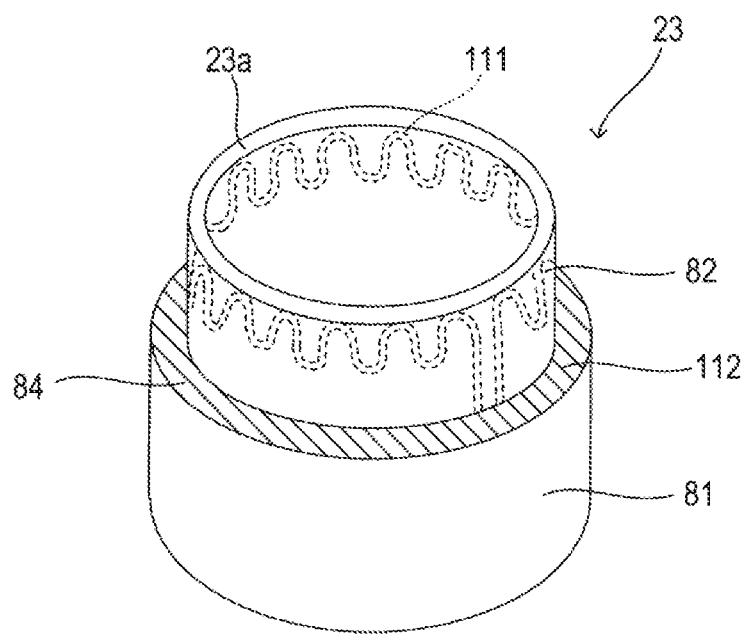
FIG. 4 is a perspective view of an insulating spacer from a forward end side.

As shown in FIG. 4, the insulating spacer 23 includes a heat generation resistor 111. The heat generation resistor 111, which has a wire-like shape, is embedded in the small diameter portion 82 so that the heat generation resistor 111 extends over the entire circumference of the small diameter portion 82 while meandering. The insulating spacer 23 has a heater terminal 112. The heater terminal 112 is formed over the entire outer circumferential surface of the sloping portion 84. One end of the heat generation resistor 111 is connected to the heater terminal 112.

Figure 5:
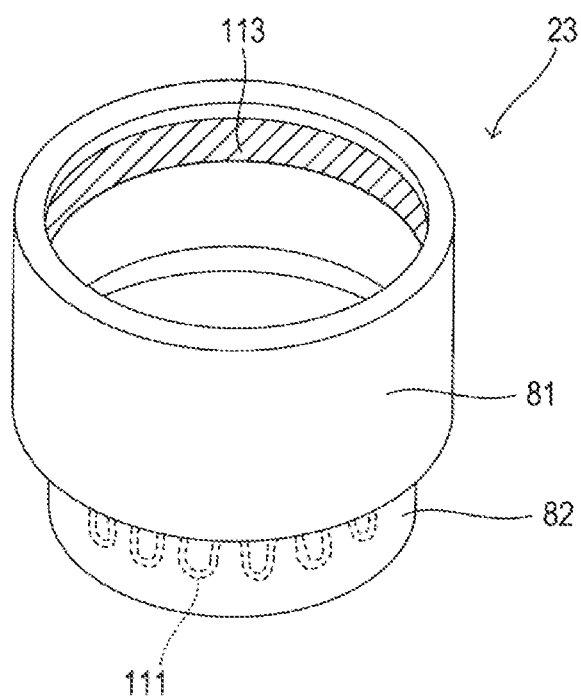
FIG. 5 is a perspective view of the insulating spacer from a back end side.

As shown in FIG. 5, the insulating spacer 23 has a heater terminal 113. The heater terminal 113 is formed on the inner circumferential surface of the large diameter portion 81 in such a manner as to have an annular shape; i.e., extend in the circumferential direction of the large diameter portion 81. The other end of the heat generation resistor 111 is connected to the heater terminal 113. In a state in which the insulating spacer 23 and the insulating spacer 24 are fixedly disposed in the metallic attachment member 61, the heater connection metallic member 89 disposed in the groove 87a of the insulating spacer 24 is in contact with the heater terminal 113 of the insulating spacer 23.

Figure 6:
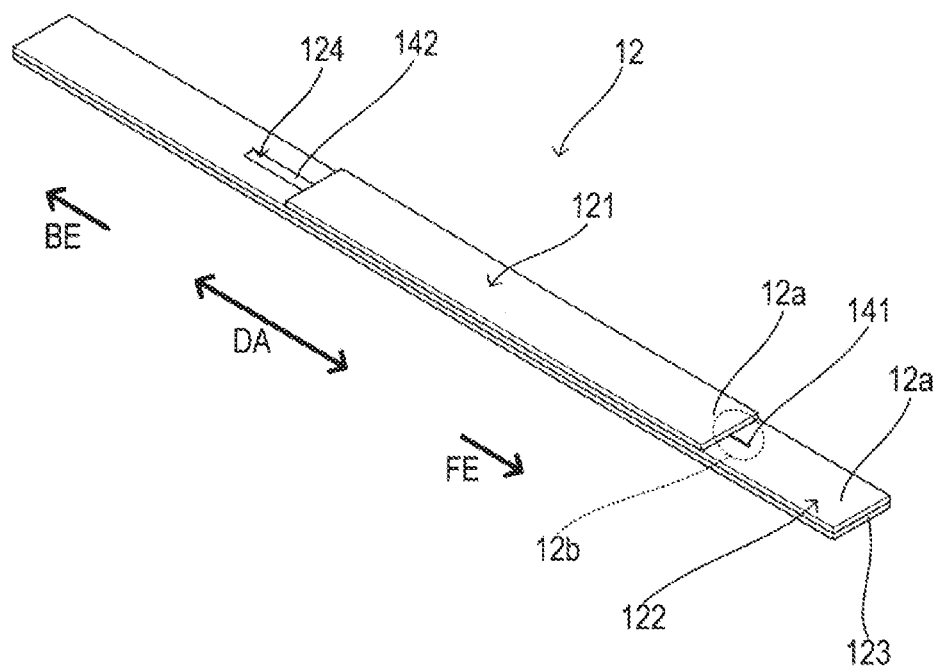
FIG. 6 is a perspective view of a ceramic element.

As shown in FIG. 6, the ceramic element 12 is formed by successively stacking ceramic layers 121, 122, and 123 so that the ceramic element 12 has the shape of a plate extending in the axial direction DA. The ceramic element 12 includes a discharge electrode member 124 interposed between the ceramic layer 121 and the ceramic layer 122.

Figure 7:
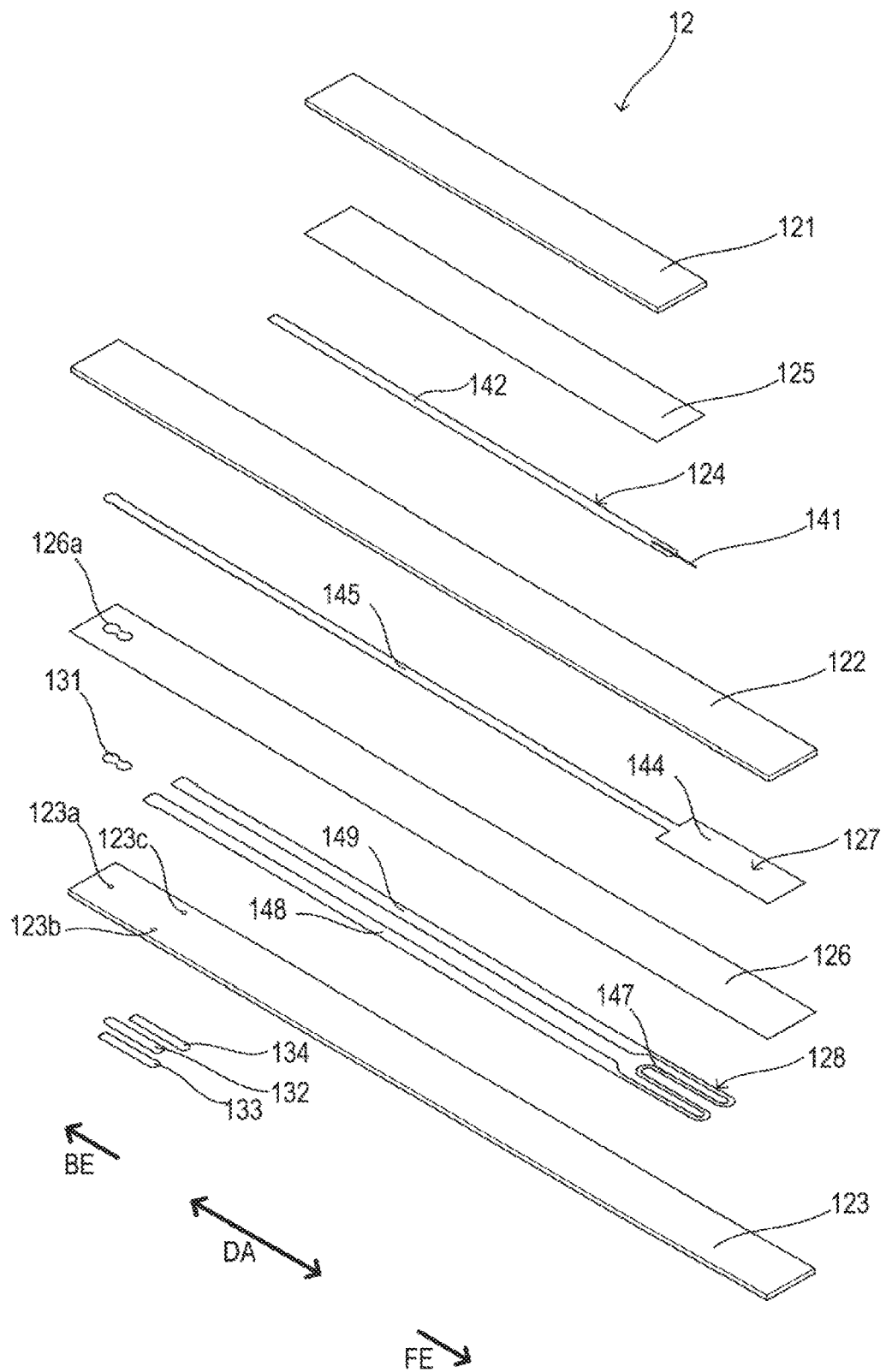
FIG. 7 is an exploded perspective view of the ceramic element.

As shown in FIG. 7, each of the ceramic layers 121, 122, and 123 is a plate-shaped member formed of alumina and extends in the axial direction DA. The length of the ceramic layer 121 measured in the axial direction DA is smaller than those of the ceramic layers 122 and 123. The length of the ceramic layer 122 measured in the axial direction DA is equal to that of the ceramic layer 123.

The discharge electrode member 124 has a needle-shaped electrode portion 141 and a lead portion 142. The needle-shaped electrode portion 141 is a needle-shaped member formed of platinum and extends in the axial direction DA. The lead portion 142 is an elongated member formed of tungsten and extends in the axial direction DA. The lead portion 142 is formed by pattern printing. An end portion of the needle-shaped electrode portion 141 on the back end side BE is connected to an end portion of the lead portion 142 on the forward end side FE.

The ceramic element 12 has insulating cover layers 125 and 126, an auxiliary electrode member 127, and an element heater 128.

The insulating cover layer 125 is an alumina-made member which is formed by printing to have the same rectangular shape as the ceramic layer 121. The insulating cover layer 126 is an alumina-made member which is formed by printing to have the same rectangular shape as the ceramic layers 122 and 123.

The auxiliary electrode member 127 is a thin-film-shaped electrode which is formed by pattern printing and extends in the axial direction DA. The auxiliary electrode member 127 has a rectangular auxiliary electrode portion 144 and an elongated lead portion 145 extending in the axial direction DA. An end portion of the auxiliary electrode portion 144 on the back end side BE is connected to an end portion of the lead portion 145 on the forward end side FE.

The element heater 128 is formed by pattern printing with a platinum paste which contains platinum as a main component and also contains ceramic. The element heater 128 has a heat generation resistor 147 and lead portions 148 and 149. The lead portion 148 is connected to one end of the heat generation resistor 147, and the lead portion 149 is connected to the other end of the heat generation resistor 147.

The ceramic element 12 has a structure in which the element heater 128, the insulating cover layer 126, the auxiliary electrode member 127, the ceramic layer 122, the discharge electrode member 124, the insulating cover layer 125, and the ceramic layer 121 are stacked on the ceramic layer 123 in this order as viewed from the ceramic layer 123 side. Notably, as shown in FIG. 6, the discharge electrode member 124 is disposed so that a portion of the needle-shaped electrode portion 141 on the forward end side FE and a portion of the lead portion 142 on the back end side BE are not covered by the insulating cover layer 125 and the ceramic layer 121.

Portions of the ceramic layers 121 and 122, which portions are exposed to the outside of the ceramic element 12 and protrude toward the forward end side FE from the forward end of the ceramic holder 43 accommodated in the metallic shell 31, have gas contact surfaces 12a which come into contact with the exhaust gas. A portion of the gas contact surfaces 12a around the needle-shaped electrode portion 141 is a gas contact surface 12b. If the quality of the insulation of the gas contact surface 12b deteriorates, corona discharge by the needle-shaped electrode portion 141 is hindered.

As shown in FIG. 7, the ceramic element 12 includes an electrically conductive trace 131 and electrode pads 132, 133, and 134.

The electrically conductive trace 131 is disposed between the insulating cover layer 126 and the ceramic layer 123 to be located on the back end side BE of the element heater 128. The electrode pads 132, 133, and 134 are disposed on (in close contact with) a surface of the ceramic layer 123, which surface is located on the side opposite the ceramic layer 122. The electrode pads 132, 133, and 134 are disposed on an end portion of the ceramic element 12 on the back end side BE.

The electrically conductive trace 131 is electrically connected to the lead portion 145 of the auxiliary electrode member 127 via a through hole 126a formed in an end portion of the insulating cover layer 126 on the back end side BE. Further, the electrically conductive trace 131 is electrically connected to the electrode pad 132 via a through hole conductor 123a penetrating the ceramic layer 123.

The electrode pad 133 is electrically connected to the lead portion 148 of the element heater 128 via a through hole conductor 123b penetrating the ceramic layer 123. The electrode pad 134 is electrically connected to the lead portion 149 of the element heater 128 via a through hole conductor 123c penetrating the ceramic layer 123.

An end portion of the discharge electrode member 124 on the back end side BE is in contact with the metallic terminal 106. The electrode pad 132 is in contact with the metallic terminal 107. The electrode pad 133 is in contact with the metallic terminal 108. The electrode pad 134 is in contact with the metallic terminal 109.

Figure 8:
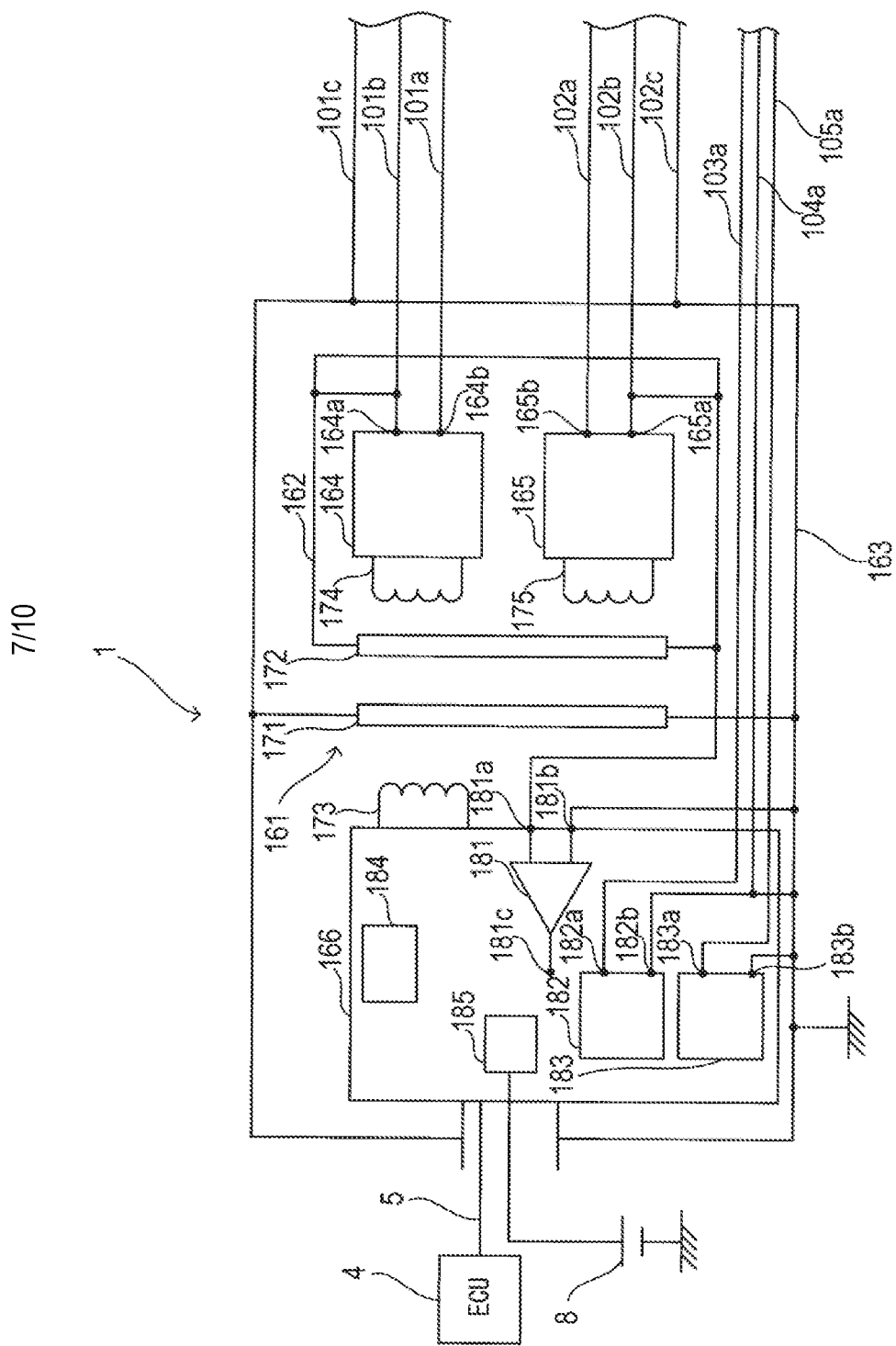
FIG. 8 is a diagram showing the circuit configuration of the sensor control apparatus.

As shown in FIG. 8, the sensor control apparatus 1 includes an isolation transformer 161, an inner circuit case 162, an outer circuit case 163, an ion source power supply circuit 164, an auxiliary electrode power supply circuit 165, and a measurement control section 166.

The isolation transformer 161 has a primary core 171, a secondary core 172, a primary coil 173, and secondary coils 174 and 175. The primary coil 173 is wound around the primary core 171. Opposite ends of the primary coil 173 are connected to the measurement control section 166. The secondary coils 174 and 175 are wound around the secondary core 172. Opposite ends of the secondary coil 174 are connected to the ion source power supply circuit 164. Opposite ends of the secondary coil 175 are connected to the auxiliary electrode power supply circuit 165.

The inner circuit case 162 is a conductor which surrounds the ion source power supply circuit 164 and the auxiliary electrode power supply circuit 165. The inner circuit case 162 is connected to the secondary core 172, the inside outer conductor 101b, and the inside outer conductor 102b.

The outer circuit case 163 is a conductor which surrounds the inner circuit case 162 and the measurement control section 166. The outer circuit case 163 is grounded. Also, the outer circuit case 163 is connected to the primary core 171, the outside outer conductor 101c, and the outside outer conductor 102c.

The ion source power supply circuit 164 outputs a high voltage which is generated between the opposite ends of the secondary coil 174 as a result of flow of current through the primary coil 173. The ion source power supply circuit 164 has output terminals 164a and 164b. The output terminal 164a is connected to the inside outer conductor 101b. The output terminal 164b is connected to the lead wire 101a. Notably, the potential of the output terminal 164b is higher than the potential of the output terminal 164a.

The auxiliary electrode power supply circuit 165 outputs a high voltage which is generated between the opposite ends of the secondary coil 175 as a result of flow of current through the primary coil 173. The auxiliary electrode power supply circuit 165 has output terminals 165a and 165b. The output terminal 165a is connected to the inside outer conductor 102b. The output terminal 165b is connected to the lead wire 102a. Notably, the potential of the output terminal 165b is higher than the potential of the output terminal 165a.

The measurement control section 166 includes a current detection circuit 181, heater energization circuits 182 and 183, a microcomputer 184, and a regulated power supply 185.

The current detection circuit 181 has input terminals 181a and 181b and an output terminal 181c. The input terminal 181a is connected to the inner circuit case 162. The input terminal 181b is connected to the outer circuit case 163. The current detection circuit 181 detects the current flowing between the input terminals 181a and 181b, and outputs a signal representing the detected current from the output terminal 181c.

The heater energization circuit 182 has output terminals 182a and 182b. The output terminal 182a is connected to the lead wire 103a. The output terminal 182b is connected to the outer circuit case 163. In accordance with an instruction from the microcomputer 184, the heater energization circuit 182 generates a PWM control voltage between the output terminal 182a and the output terminal 182b so as to output a PWM signal to the element heater 128, thereby controlling the temperature of the element heater 128. PWM is an abbreviation for "Pulse Width Modulation".

The heater energization circuit 183 has output terminals 183a and 183b. The output terminal 183a is connected to the lead wire 105a. The output terminal 183b is connected to the outer circuit case 163 and to the lead wire 104a. In accordance with an instruction from the microcomputer 184, the heater energization circuit 183 generates a previously set heater energization voltage between the output terminal 183a and the output terminal 183b so as to cause the heat generation resistor 111 to generate heat.

The microcomputer 184 includes a CPU, a ROM, a RAM, a signal input output section, etc. The various functions of the microcomputer are realized by a program which is stored in a non-transitory tangible recording medium and executed by the CPU. In this example, the ROM corresponds to a non-transitory tangible recording medium storing the program. Also, a method corresponding to the program is performed as a result of execution of this program. Notably, some or all of the functions of the CPU may be realized by hardware; for example, by a single IC or a plurality of ICs.

The regulated power supply 185 receives a voltage from a battery 8 disposed outside the sensor control apparatus 1 and generates a voltage for operating the sensor control apparatus 1.

Figure 9:
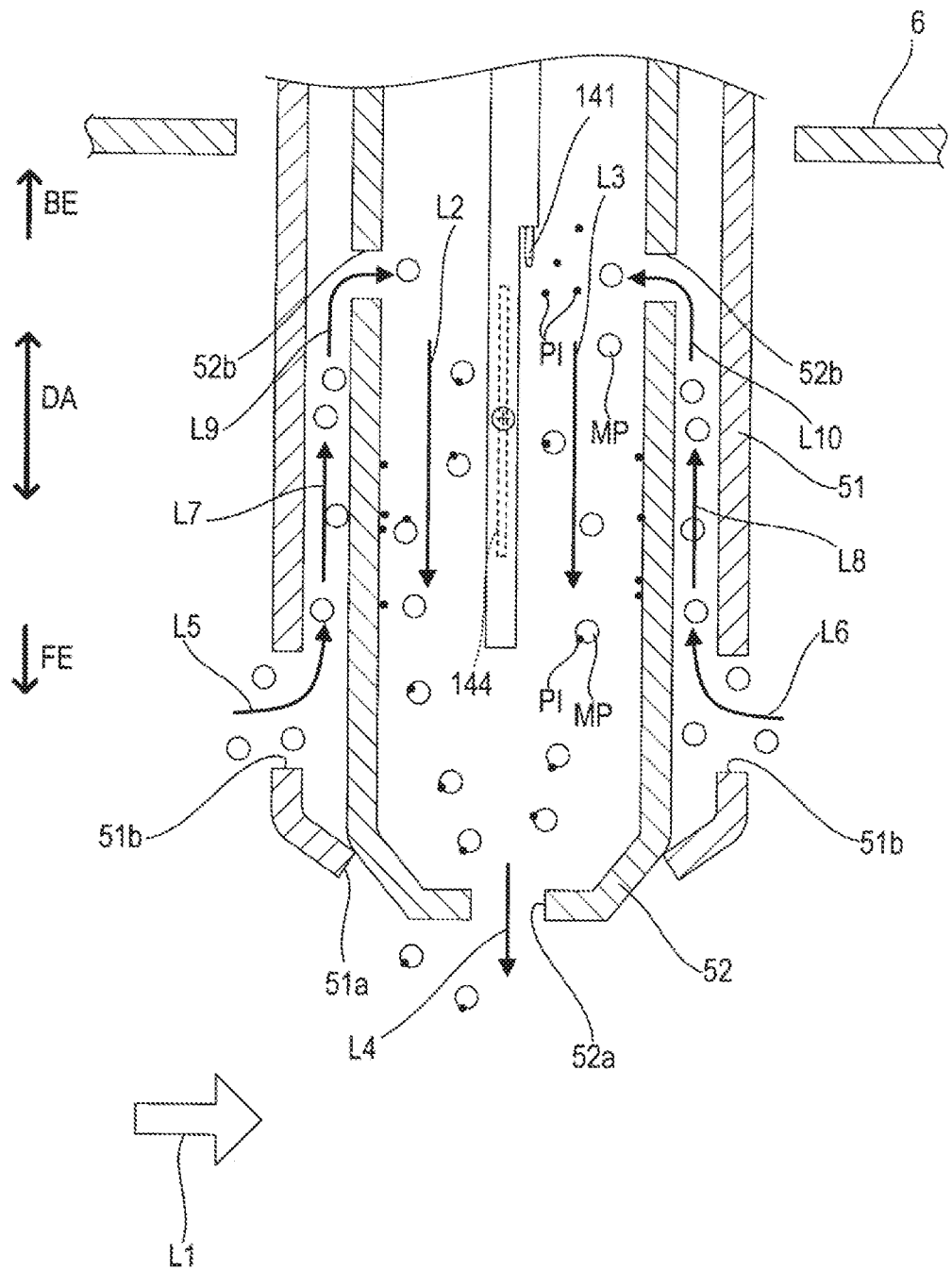
FIG. 9 is a schematic view illustrating the detection operation of the particulate sensor.

As shown in FIG. 9, the outer protector 51 has an opening 51a formed in its end portion on the forward end side FE. Also, the outer protector 51 has a plurality of gas intake openings 51b formed in a portion of its circumferential wall, which portion is located on the forward end side FE. The inner protector 52 is disposed such that an end portion of the inner protector 52 on the forward end side FE protrudes toward the forward end side FE from the opening 51a of the outer protector 51.

The inner protector 52 has a gas discharge opening 52a formed in its end portion on the forward end side FE. Also, the inner protector 52 has a plurality of gas introduction openings 52b formed in its circumferential wall such that the gas introduction openings 52b are located on the back end side BE with respect to the gas intake openings 51b of the outer protector 51.

When the exhaust gas flows inside the exhaust pipe 6 as indicated by arrow L1, the flow velocity of the exhaust gas increases in a region outside the gas discharge opening 52a of the inner protector 52, and a negative pressure is generated in the vicinity of the gas discharge opening 52a.

Due to this negative pressure, the exhaust gas within the inner protector 52 is discharged to the outside of the inner protector 52 through the gas discharge opening 52a as indicated by arrows L2, L3, and L4. As a result, the exhaust gas present in the vicinity of the gas intake openings 51b of the outer protector 51 is drawn into the internal space of the outer protector 51 through the gas intake openings 51b as indicated by arrows L5 and L6. Further, the exhaust gas drawn into the internal space of the outer protector 51 flows into the internal space of the inner protector 52 through the gas introduction openings 52b as indicated by arrows L7, L8, L9, and L10.

When a high voltage (e.g., 1 to 2 kV) is applied to the needle-shaped electrode portion 141 of the discharge electrode member 124 by the ion source power supply circuit 164, corona discharge occurs between the needle-shaped electrode portion 141 and the inner protector 52. As a result of this corona discharge, positive ions PI are generated around the needle-shaped electrode portion 141.

Since the exhaust gas flows into the internal space of the inner protector 52 from the gas introduction openings 52b, a flow of the exhaust gas from the back end side BE toward the forward end side FE occurs within the inner protector 52. As a result, the positive ions PI generated around the needle-shaped electrode portion 141 adhere to particulates MP contained in the exhaust gas and electrify the particulates MP, whereby electrified particulates are produced.

Also, a previously set voltage (e.g., 100 to 200 V) is applied to the auxiliary electrode portion 144 of the auxiliary electrode member 127 by the auxiliary electrode power supply circuit 165. As a result, floating positive ions PI which have not adhered to particulates MP contained in the exhaust gas move in a direction away from the auxiliary electrode portion 144 due to repulsive forces acting between the floating positive ions PI and the auxiliary electrode portion 144. The positive ions PI moving in the direction away from the auxiliary electrode portion 144 are trapped by the inner wall of the inner protector 52 which serves as a negative pole. Meanwhile, since the particulates electrified as a result of adhesion of the positive ions PI thereto are greater in mass than the positive ions PI, the influence of the repulsive force acting between the electrified particulates and the auxiliary electrode portion 144 is small. Therefore, the electrified particulates are discharged from the gas discharge opening 52a with the flow of the exhaust gas.

Notably, the inner metallic member 21 and the outer metallic member 22 are insulated from each other by the insulating spacers 23 and 24. Namely, the outer metallic member 22 is grounded through the outside outer conductors 101c and 102c, and the inner metallic member 21 is held in the exhaust pipe 6 in a state in which the inner metallic member 21 is insulated from the outer metallic member 22 which is at ground potential.

When defining current corresponding to the flow of the positive ions PI discharged to the outside of the particulate sensor 2 as the leakage current $I_{esc}$ and current corresponding to the flow of the positive ions PI trapped by the inner metallic member 21 as the trapped current $I_{trp}$, a relation represented by the following equation (1) holds.

$$I_{in}=I_{dc}+I_{trp}+I_{esc} \quad (1)$$

The discharge current $I_{dc}$ and the trapped current $I_{trp}$ flow into the inner metallic member 21, and the input current $I_{in}$ is maintained at a fixed value. The input current $I_{in}$ is current for generating the positive ions PI by means of corona discharge.

Therefore, as shown in the following equation (2), the leakage current $I_{esc}$ can be computed from the difference between the input current $I_{in}$ and the sum of the discharge current $I_{dc}$ and the trapped current $I_{trp}$.

$$I_{esc}=I_{in}-(I_{dc}+I_{trp}) \quad (2)$$

As understood from the above equation (2), the current flowing through the inner metallic member 21 is smaller than the input current by the leakage current $I_{esc}$. Therefore, the potential of the inner metallic member 21 drops (i.e., the reference potential of the inner metallic member 21 becomes lower than the reference potential of the outer metallic member 22), and compensation current $I_c$ which compensates the potential drop flows from the current detection circuit 181 to the inner metallic member 21 through the inside outer conductor 102b. This compensation current $I_c$ corresponds to the leakage current $I_{esc}$. In other words, the compensation current $I_c$ (or the leakage current $I_{esc}$) corresponds to the signal current which flows in accordance with the amount of the electrified particulates. The current detection circuit 181 measures the value of the compensation current $I_c$ and treats the measured value of the compensation current $I_c$ as a measured value of the leakage current $I_{esc}$. The current detection circuit 181 outputs to the microcomputer 184 a leakage current signal representing the measured value of the leakage current $I_{esc}$.

The microcomputer 184 determines the measured value of the leakage current $I_{esc}$ based on the leakage current signal input from the current detection circuit 181 and computes the amount of particulates in the exhaust gas using a map or a computation expression which shows the relation between the measured value of the leakage current $I_{esc}$ and the amount of particulates in the exhaust gas. The amount of particulates in the exhaust gas can be evaluated, for example, as an amount determined based on the surface area of the particulates or an amount determined based on the mass of the particulates. Alternatively, the amount of particulates in the exhaust gas can be evaluated as an amount determined based on the number of particulates per unit volume of the exhaust gas. In the present embodiment, the microcomputer 184 computes the amount of particulates in the unit of $mg/m^3$.

Also, the microcomputer 184 causes the element heater 128 and the heat generation resistor 111 to generate heat, thereby burning and removing the particulates adhering to the needle-shaped electrode portion 141 of the discharge electrode member 124 and the particulates adhering to the gas contact surface 23a of the insulating spacer 23.

Also, the microcomputer 184 executes a sensor anomaly determination process. Next, the steps of the sensor anomaly determination process will be described. The sensor anomaly determination process is repeatedly executed when the microcomputer 184 is operating.

Figure 10:
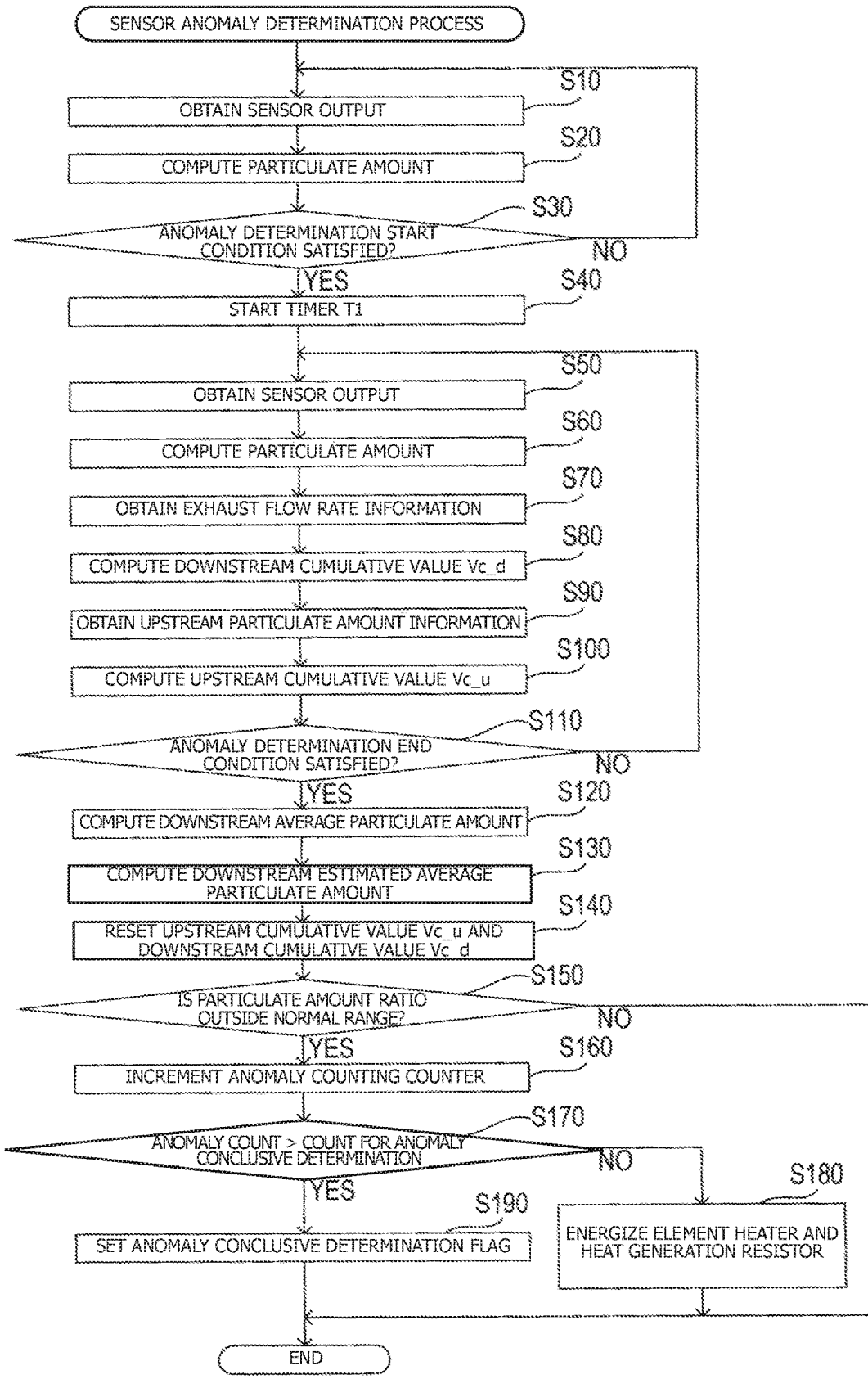
FIG. 10 is a flowchart showing a sensor anomaly determination process.

When the sensor anomaly determination process is executed, as shown in FIG. 10, the CPU of the microcomputer 184 first obtains, in S10, the leakage current signal output from the current detection circuit 181 (hereinafter referred to as the "sensor output") when a unit measurement time (50 ms in the present embodiment) set in advance has elapsed from the last time at which the CPU had obtained the sensor output. Subsequently, in S20, the CPU computes the amount of particulates in the exhaust gas based on the sensor output obtained in S10.

In S30, the CPU judges whether or not an anomaly determination start condition set in advance is satisfied. The anomaly determination start condition in the present embodiment is such that an anomaly determination start time (for example, 10 sec in the present embodiment) set in advance has elapsed after the value of a DPF regeneration flag represented by DPF regeneration flag information regularly received from the engine ECU 4 (at intervals of 50 ms in the present embodiment) had changed from 1 to 0. The engine ECU 4 sets the value of the DPF regeneration flag to 1 when the engine ECU 4 is executing a DPF regeneration process for burning particulates collected by the DPF 7, thereby removing the collected particulates. The engine ECU 4 sets the value of the DPF regeneration flag to 0 when the engine ECU 4 is not executing the DPF regeneration process. In the following description, setting a flag means setting the value of the flag to 1, and clearing the flag means setting the value of the flag to 0.

Notably, the engine ECU 4 estimates the amount of particulates collected by the DPF 7 and performs, as the DPF regeneration process, a post injection of fuel during an exhaust stroke when the estimated particulate amount becomes larger than a regeneration start judgment value set in advance. An oxidation catalyst disposed in the exhaust pipe 6 and located on the upstream side of the DPF 7 burns, through catalytic reaction, hydrocarbons (HC) which are unburned fuel supplied to the exhaust pipe 6 as a result of the post injection, thereby increasing the temperature of the exhaust gas. Since the exhaust gas having an increased temperature flows into the DPF 7, the temperature of the DPF 7 increases, and the particulates collected by the DPF 7 burn. As a result, the particulates are removed from the DPF 7.

In the case where the anomaly determination start condition is not satisfied, the CPU proceeds to S10. Meanwhile, in the case where the anomaly determination start condition is satisfied, in S40, the CPU starts a timer T1 provided in the RAM. This timer T1 is incremented at intervals of, for example, 1 sec. When the timer T1 is started, the timer T1 is incremented so that its count value increases from 0 (namely, 1 is added to the count value).

In S50, the CPU obtains the sensor output when the unit measurement time has elapsed from the last time at which the CPU had obtained the sensor output. Subsequently, in S60, the CPU computes the amount of particulates in the exhaust gas based on the sensor output obtained in S50. Further, in S70, the CPU obtains exhaust flow rate information from the engine ECU 4. The exhaust flow rate information represents the flow rate of the exhaust gas discharged from the diesel engine 3 into the exhaust pipe 6 (hereinafter referred to as the "exhaust flow rate").

In S80, the CPU computes a downstream cumulative value Vc_d. Specifically, the CPU multiplies the particulate amount computed in S60 by the exhaust flow rate represented by the exhaust flow rate information. Subsequently, the CPU adds the value obtained as a result of the multiplication to the value stored in a storage area provided in the RAM for the downstream cumulative value Vc_d, and stores the value obtained as a result of the addition in the storage area for the downstream cumulative value Vc_d. Notably, the engine ECU 4 computes the exhaust flow rate based on at least intake flow rate, exhaust temperature, and fuel injection amount. Also, the unit of the particulate amount computed in S60 is mg/m$^3$, and the unit of the exhaust flow rate represented by the exhaust flow rate information is m$^3$/s. Accordingly, the unit of the downstream cumulative value Vc_d is mg/s.

Also, in S90, the CPU obtains upstream particulate amount information from the engine ECU 4. The upstream particulate amount information represents the amount of particulates contained in the exhaust gas discharged from the diesel engine 3 (hereinafter referred to as the upstream particulate amount). The unit of the upstream particulate amount is mg/s. The engine ECU 4 estimates the upstream particulate amount based on control parameters (e.g., intake air amount, fuel injection timing, injection amount, injection pressure, etc.) for controlling the diesel engine 3 and detection signals from various sensors for detecting the operation conditions of the diesel engine 3. Notably, since the method by which the engine ECU 4 estimates the upstream particulate amount is publicly known (see, for example, Japanese Patent Application Laid-Open (kokai) No. 2015-190397, its detailed description is omitted.

In S100, the CPU computes an upstream cumulative value Vc_u. Specifically, the CPU adds together the value stored in a storage area provided in the RAM for the upstream cumulative value Vc_u and the upstream particulate amount represented by the upstream particulate amount information obtained in S90. The CPU stores the value obtained as a result of the addition in the storage area for the upstream cumulative value Vc_u.

In S110, the CPU judges whether or not an anomaly determination end condition set in advance is satisfied. The anomaly determination end condition in the present embodiment is such that the value of the timer T1 is equal to or greater than a value corresponding to an anomaly determination end time (20 sec in the present embodiment) set in advance.

In the case where the anomaly determination end condition is not satisfied, the CPU proceeds to S50. Meanwhile, in the case where the anomaly determination end condition is satisfied, in S120, the CPU computes a downstream average particulate amount. Specifically, the CPU computes the downstream average particulate amount by dividing the downstream cumulative value Vc_d by the value of the timer T1. Also, in S130, the CPU computes a downstream estimated average particulate amount. Specifically, the CPU computes a downstream estimated particulate amount Ve_d in accordance with the following equation (3) using the upstream cumulative value Vc_u and a previously set collection efficiency just after regeneration EF_r (for example, 0.6 in the present embodiment). Subsequently, the CPU computes the downstream estimated average particulate amount by dividing the computed downstream estimated particulate amount Ve_d by the value of the timer T1.

$$Ve\_d = (1-EF\_r) \times Vc\_u \quad (3)$$

Further, in S140, the CPU resets the downstream cumulative value Vc_d and the upstream cumulative value Vc_u (namely, sets these values to 0).

Subsequently, in S150, the CPU judges whether or not a particulate amount ratio falls outside a previously set normal range. The particulate amount ratio is a value obtained by dividing the downstream average particulate amount by the downstream estimated average particulate amount. In the case where the particulate amount ratio falls within the normal range, the CPU ends the current execution of the sensor anomaly determination process. Meanwhile, in the case where the particulate amount ratio falls outside the normal range, in S160, the CPU increments an anomaly counting counter provided in the RAM.

Subsequently, in S170, the CPU judges whether or not the value of the anomaly counting counter (hereinafter referred to as the "anomaly count") is greater than a number of times for anomaly conclusive determination (hereinafter referred to as the "count for anomaly conclusive determination"). In the case where the anomaly count is equal to or less than the count for anomaly conclusive determination, in S180, the CPU causes the element heater 128 and the heat generation resistor 111 to generate heat for a heating execution time set in advance and ends the current execution of the sensor anomaly determination process.

Meanwhile, in the case where the anomaly count is greater than the count for anomaly conclusive determination, in S190, the CPU sets an anomaly conclusive determination flag provided in the RAM and ends the current execution of the sensor anomaly determination process.

Figure 11:
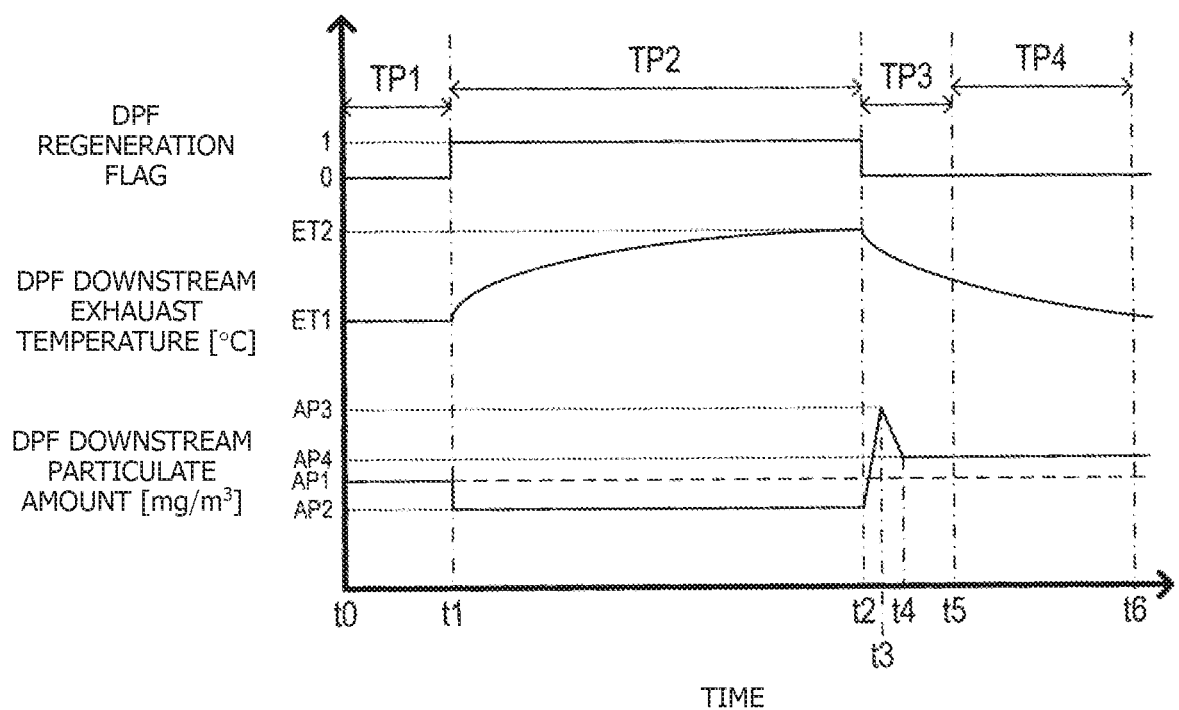
FIG. 11 is a graph showing time-course changes in DPF downstream particulate amount, etc.

FIG. 11 shows time-course changes in the DPF regeneration flag, the exhaust gas temperature on the downstream side of the DPF (hereinafter referred to as the "DPF downstream exhaust temperature") and the amount of particulates on the downstream side of the DPF (hereinafter referred to as the "DPF downstream particulate amount") between a point in time just before the DPF regeneration process and a point in time just after the DPF regeneration process. The DPF downstream exhaust temperature is the temperature of the exhaust gas discharged from the DPF 7. The DPF downstream particulate amount is the amount of particulates contained in the exhaust gas discharged from the DPF 7.

As shown in FIG. 11, a period TP1 from time t0 to time t1 is a period just before the DPF regeneration process. In the period TP1, the value of the DPF regeneration flag is 0. The DPF downstream exhaust temperature in the period TP1 is defined as a temperature ET1 [° C.], and the DPF downstream particulate amount in the period TP1 is defined as a particulate amount AP1 [mg/m$^3$].

A period TP2 from time t1 to time t2 is a period during which the DPF regeneration process is performed. In the period TP2, the value of the DPF regeneration flag is 1. In the period TP2, the DPF downstream exhaust temperature gradually rises from the temperature ET1 [° C.] and reaches a temperature ET2 [° C.] at time t2. The DPF downstream particulate amount in the period TP2 is a particulate amount AP2 [mg/m$^3$] smaller than the particulate amount AP1 [mg/m$^3$].

A period TP3 from time t2 to time t5 is a period which is just after the DPF regeneration process and in which the sensor anomaly judgment (namely, the processing of S30 to S150) is not performed. In the period TP3, the value of the DPF regeneration flag is 0. In the period TP3, the DPF downstream exhaust temperature gradually drops from the temperature ET2 [° C.]. Also, in the period TP3, the DPF downstream particulate amount exhibits a peak just after the DPF regeneration process. Namely, the DPF downstream particulate amount sharply increases just after the DPF regeneration process and reaches a particulate amount AP3 [mg/m$^3$] at time t3. Just after that, the DPF downstream particulate amount sharply decreases and becomes a particulate amount AP4 [mg/m$^3$] at time t4. The particulate amount AP4 [mg/m$^3$] is larger than the particulate amount AP1 [mg/m$^3$]. After that, the DPF downstream particulate amount remains constant (the particulate amount AP4 [mg/m$^3$]).

A period TP4 from time t5 to time t6 is a period which is just after the DPF regeneration process and in which the sensor anomaly judgment is performed. In the period TP4, the value of the DPF regeneration flag is 0. In the period TP4, the DPF downstream exhaust temperature gradually drops. Also, in the period TP4, the DPF downstream particulate amount remains constant (the particulate amount AP4 [mg/m$^3$]). Accordingly, in the period TP4 just after the DPF regeneration process, the DPF downstream particulate amount is larger than that in the period TP1 just before the DPF regeneration process.

The sensor control apparatus 1 configured as described above controls the particulate sensor 2 which detects the amount of particulates discharged from the DPF 7 attached to the exhaust pipe 6 of the diesel engine 3 for collecting particulates contained in the exhaust gas discharged from the diesel engine 3. The particulate sensor 2 includes the inner metallic member 21 and the ceramic element 12. The inner metallic member 21 and the ceramic element 12 are collectively referred to as a detection section. The inner metallic member 21 and the ceramic element 12 (i.e., the detection section) are configured to electrify particulates contained in the exhaust gas flowing thereinto, thereby producing electrified particulates.

The sensor control apparatus 1 judges whether or not the present point in time is within the previously set anomaly determination period just after completing the DPF regeneration process of regenerating the DPF 7 by removing the particulates collected by the DPF 7. The anomaly determination period is a period from a point in time when the anomaly determination start condition is satisfied to a point in time when the anomaly determination end condition is satisfied. In the case where the sensor control apparatus 1 judges that the present point in time is within the anomaly determination period, the sensor control apparatus 1 obtains the sensor output representing the result of the detection by the particulate sensor 2. The sensor control apparatus 1 judges whether or not the particulate sensor 2 is anomalous, based on the sensitivity characteristic of the sensor output. Specifically, the sensor control apparatus 1 judges that the particulate sensor 2 is anomalous in the case where the particulate amount ratio obtained by dividing the downstream average particulate amount by the downstream estimated average particulate amount falls outside the normal range. Namely, the particulate amount ratio corresponds to the sensitivity characteristic.

As described above, the sensor control apparatus 1 can detect the amount of particulates discharged from the DPF 7 just after completing the DPF regeneration process. The collection efficiency of the DPF 7 just after completing the DPF regeneration process is lower than that before start of the DPF regeneration process. Namely, just after completing the DPF regeneration process, the sensor output becomes larger as compared with the sensor output before start of the DPF regeneration process. Therefore, in the case where the sensor output is smaller than a previously set normal lower limit just after completing the filter regeneration process, it is possible to judge that the particulate sensor 2 is anomalous because the particulate sensor 2 does not have a predetermined sensitivity for the particulate amount.

As described above, the sensor control apparatus 1 can judge whether or not the particulate sensor 2 is anomalous, based on the sensitivity characteristic of the sensor output. Therefore, in the case where the sensor output is small, the sensor control apparatus 1 can determine the reason for the small sensor output; i.e., the sensor output is small because the DPF 7 is normal or the sensor output is small because the particulate sensor 2 is anomalous. As a result, the sensor control apparatus 1 can enhance the reliability of failure diagnosis for the DPF 7.

Also, the detection section includes the discharge electrode member 124 configured to generate ions by means of corona discharge, and is configured to cause the generated ions to adhere to particulates contained in the exhaust gas for electrification. Also, the particulate sensor 2 includes the element heater 128. In the case where the sensor control apparatus 1 judges that the particulate sensor 2 is anomalous, the sensor control apparatus 1 performs heating by the element heater 128. Moreover, in the case where the number of times the sensor control apparatus 1 has judged that the particulate sensor 2 is anomalous is greater than the previously set number of times for anomaly conclusive determination, the sensor control apparatus 1 conclusively determines that the particulate sensor 2 is anomalous.

The sensor control apparatus 1 configured as described above heats the discharge electrode member 124 using the element heater 128 in the case where the sensor control apparatus 1 determines that the particulate sensor 2 is anomalous. Thus, particulates adhering to the discharge electrode member 124 can be burned and removed. Therefore, in the case where the particulate sensor 2 is judged to be anomalous because particulates have adhered to the discharge electrode member 124 and have lowered the detection performance of the detection section, the sensor control apparatus 1 can return the particulate sensor 2 to its normal state.

In the case where the number of times the sensor control apparatus 1 has judged that the particulate sensor 2 is anomalous is greater than the number of times for anomaly conclusive determination, the sensor control apparatus 1 conclusively determines that the particulate sensor 2 is anomalous. Namely, the sensor control apparatus 1 does not conclusively determine that the particulate sensor 2 is anomalous in the case where the particulate sensor 2 has returned to the normal state as a result of heating the discharge electrode member 124 by the element heater 128. Therefore, the sensor control apparatus 1 can prevent needless reporting of an anomaly when the particulate sensor 2 is returned to the normal state.

Also, the sensor control apparatus 1 obtains the upstream particulate amount information representing the upstream particulate amount (the amount of particulates contained in the exhaust gas before flowing into the DPF 7). Also, the sensor control apparatus 1 computes the downstream estimated average particulate amount. This amount relates to the amount of particulates discharged from the DPF 7 within the anomaly determination period, based on the upstream particulate amount represented by the obtained upstream particulate amount information and the previously set collection efficiency just after regeneration EF_r (which represents the collection efficiency of the DPF 7 just after completing the DPF regeneration process). Also, the sensor control apparatus 1 computes the downstream average particulate amount, which relates to the amount of particulates discharged from the DPF 7 within the anomaly determination period, based on the obtained sensor output. Subsequently, the sensor control apparatus 1 judges whether or not the particulate sensor 2 is anomalous, based on the sensitivity characteristic obtained using the downstream estimated average particulate amount and the downstream average particulate amount.

As described above, the sensor control apparatus 1 can quantitatively determine the sensitivity characteristic of the sensor output using the downstream estimated average particulate amount estimated based on the upstream particulate amount and the collection efficiency just after regeneration EF_r and the downstream average particulate amount computed based on the sensor output.

In the above-described embodiment, the sensor control apparatus 1 corresponds to the particulate detection apparatus; the diesel engine 3 corresponds to the internal combustion engine; the DPF 7 corresponds to the filter, and the inner metallic member 21 and the ceramic element 12 correspond to the detection section.

S30, S40, and S110 correspond to the process performed by the period judgment section; S50 corresponds to the process performed by the output obtainment section; S60 to S100 and S120 to S160 correspond to the process performed by the anomaly judgment section; and the DPF regeneration process corresponds to the filter regeneration process.

The discharge electrode member 124 corresponds to the discharge section; the element heater 128 corresponds to the heating section; S180 corresponds to the process performed by the heating execution section; S170 and S190 correspond to the process performed by the anomaly conclusive determination section.

S90 corresponds to the process performed by the upstream particulate amount obtainment section; S100 and S130 correspond to the process performed by the first relevant value computation section; and S60, S70, S80, and S120 correspond to the process performed by the second relevant value computation section.

The downstream estimated average particulate amount corresponds to the first downstream particulate relevant value computed by the first relevant value computation section; and the downstream average particulate amount corresponds to the second downstream particulate relevant value computed by the second relevant value computation section.

One embodiment of the present disclosure has been described above, but the present disclosure is not limited to the above embodiment and can be embodied in various other forms.

For example, in the above-described embodiment, each of the downstream estimated average particulate amount corresponding to the first downstream particulate relevant value and the downstream average particulate amount corresponding to the second downstream particulate relevant value is the average of the amount of particulates discharged from the DPF 7 within the anomaly determination period. However, each of the first and second downstream particulate relevant values may be a cumulative value obtained by cumulating the amount of particulates discharged from the DPF 7 within the anomaly determination period.

Also, the function of one constituent element in the above embodiment may be distributed to a plurality of constituent elements, or the functions of a plurality of constituent elements may be realized by one constituent element. Part of the configuration of the above embodiment may be omitted. Also, at least part of the configuration of the above embodiment may be added to or partially replace the configurations of other embodiments.

The present disclosure may be realized in various forms other than the above-described sensor control apparatus 1. For example, the present disclosure may be realized as a system including the sensor control apparatus 1 as a constituent element, a program for causing a computer to function as the sensor control apparatus 1, a medium on which the program is recorded, and an anomaly detection method.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. JP 2018-129985 filed Jul. 9, 2018, the entire disclosure of which is incorporated herein by reference in its entirety.

What is claimed is:

1. A particulate detection apparatus for controlling a particulate sensor which detects an amount of particulates discharged from a filter attached to an exhaust pipe of an internal combustion engine for collecting particulates contained in exhaust gas discharged from the internal combustion engine, the particulate sensor including a detection section configured to electrify particulates contained in the exhaust gas flowing into an interior of the detection section so as to produce electrified particulates, the particulate detection apparatus comprising:
a period judgment section configured to judge whether or not a present point in time is within a previously set anomaly determination period just after completing a filter regeneration process for regenerating the filter by removing the particulates collected by the filter;

an output obtainment section configured to obtain a sensor output representing the result of detection by the particulate sensor in the case where the period judgment section judges that the present point in time is within the anomaly determination period; and an anomaly judgment section configured to judge whether or not the particulate sensor is anomalous based on a sensitivity characteristic of the sensor output obtained by the output obtainment section.

2. The particulate detection apparatus as claimed in claim 1, wherein the detection section includes a discharge section configured to generate ions by means of corona discharge and is configured to cause the generated ions to adhere to the particulates contained in the exhaust gas, thereby electrifying the particulates, wherein the particulate sensor includes a heating section configured to heat the discharge section, and wherein the particulate detection apparatus comprises:

a heating execution section configured to execute the heating by the heating section in the case where the anomaly judgment section judges that the particulate sensor is anomalous; and an anomaly conclusive determination section configured to conclusively determine that the particulate sensor is anomalous in the case where a number of times the anomaly judgment section has judged that the particulate sensor is anomalous is greater than a previously set number of times for an anomaly conclusive determination.

3. The particulate detection apparatus as claimed in claim 1, wherein the anomaly judgment section comprises:

an upstream particulate amount obtainment section configured to obtain upstream particulate amount information representing an upstream particulate amount which is the amount of the particulates contained in the exhaust gas before flowing into the filter;

a first relevant value computation section configured to compute a first downstream particulate relevant value, which relates to the amount of the particulates discharged from the filter within the anomaly determination period, based on the upstream particulate amount represented by the upstream particulate amount information obtained by the upstream particulate amount obtainment section and a previously set collection efficiency just after regeneration which represents the collection efficiency of the filter just after completing the filter regeneration process; and a second relevant value computation section configured to compute a second downstream particulate relevant value, which relates to the amount of particulates discharged from the filter within the anomaly determination period, based on the sensor output obtained by the output obtainment section, wherein the anomaly judgment section judges whether or not the particulate sensor is anomalous based on the sensitivity characteristic obtained using the first downstream particulate relevant value computed by the first relevant value computation section and the second downstream particulate relevant value computed by the second relevant value computation section.

4. The particulate detection apparatus as claimed in claim 3, wherein each of the first downstream particulate relevant value and the second downstream particulate relevant value is the average of the amount of the particulates discharged from the filter within the anomaly determination period.

5. The particulate detection apparatus as claimed in claim 3, wherein each of the first downstream particulate relevant value and the second downstream particulate relevant value is a cumulative value obtained by cumulating the amount of particulates discharged from the filter within the anomaly determination period.

* * * * *